Jan. 31, 1961 E. P. LARSH 2,969,928
APPARATUS FOR WINDING COILS
Filed Dec. 11, 1957 4 Sheets-Sheet 1
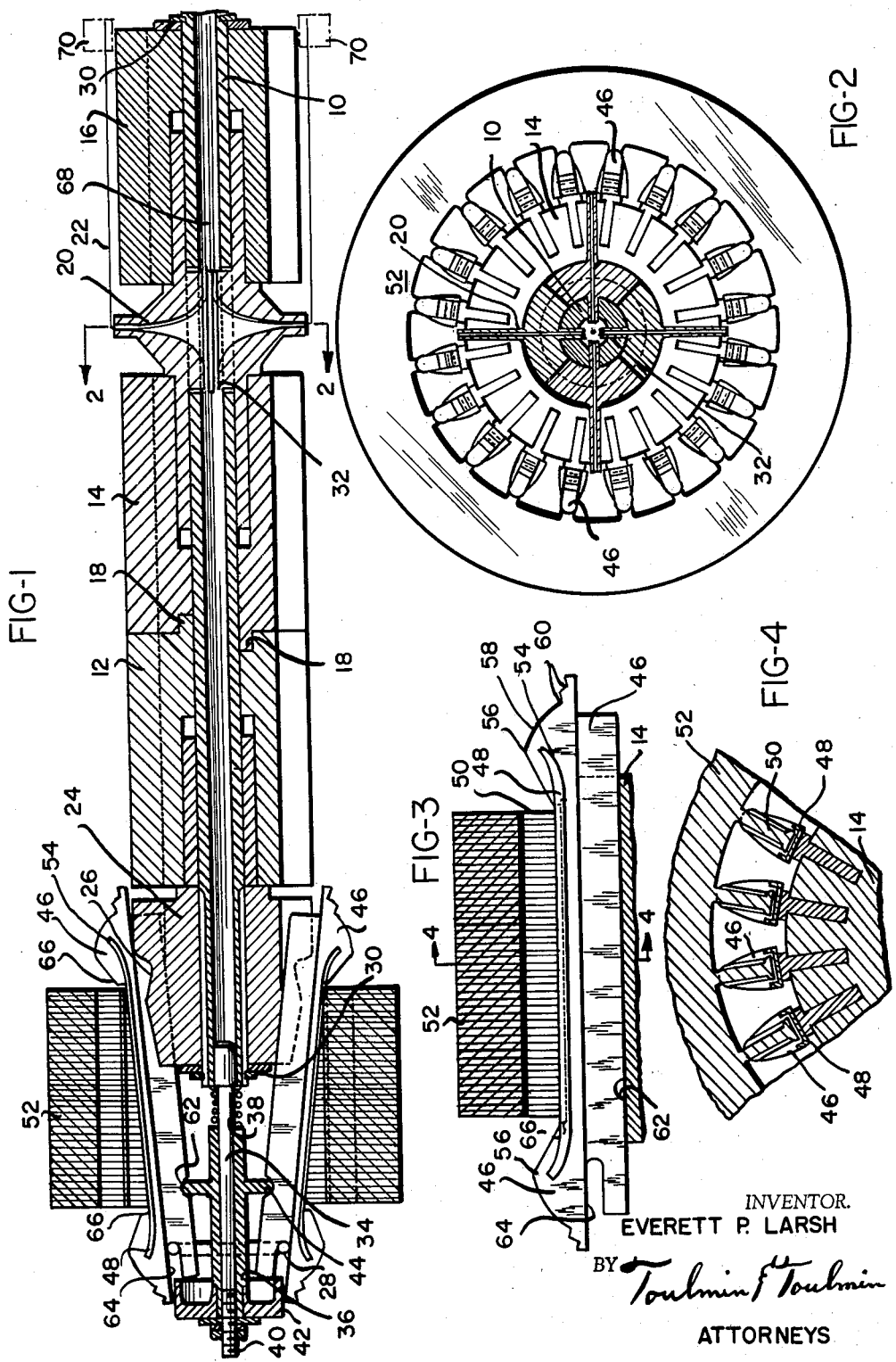
INVENTOR.
EVERETT P. LARSH
BY Toulmin & Toulmin
ATTORNEYS

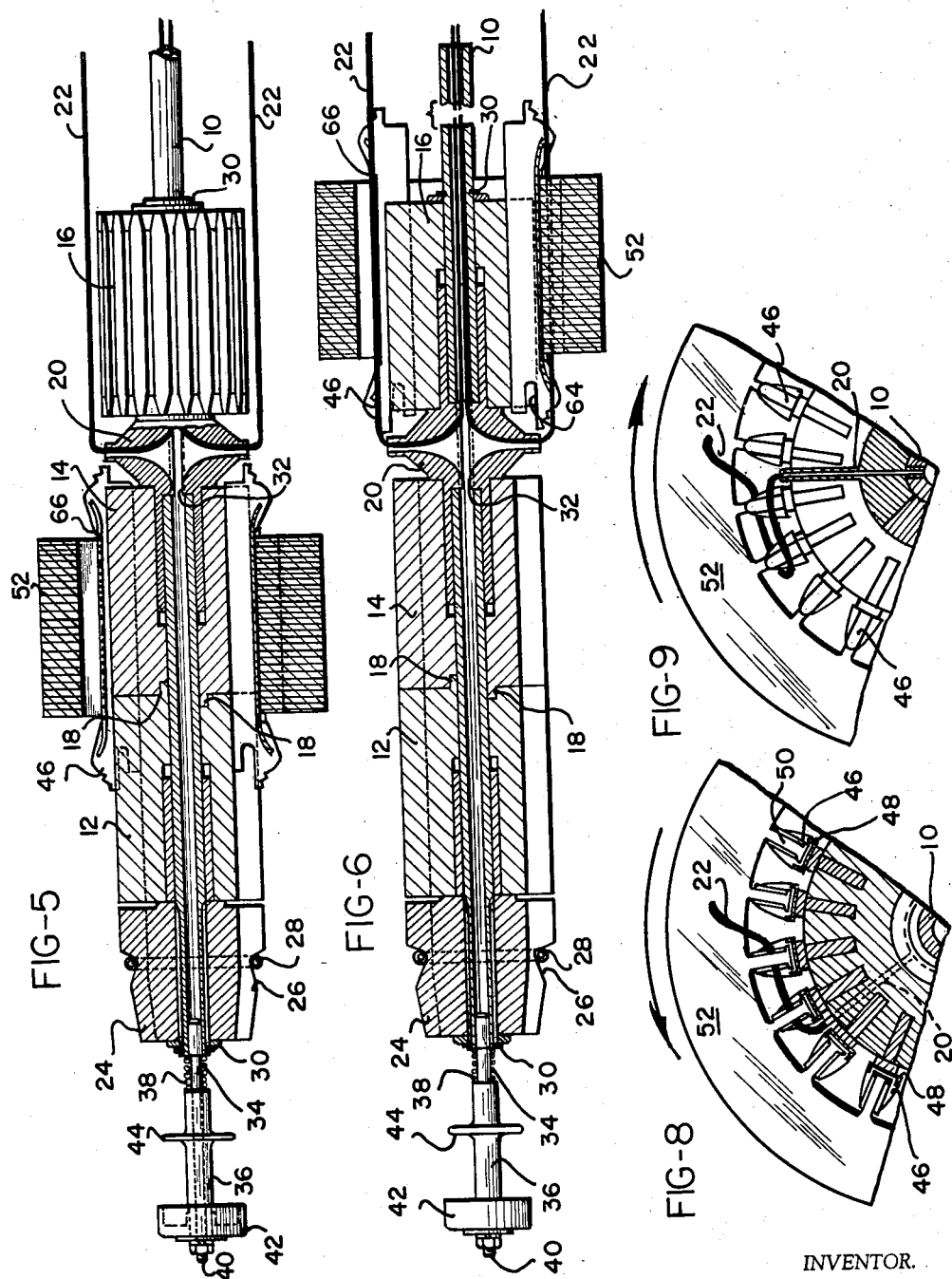

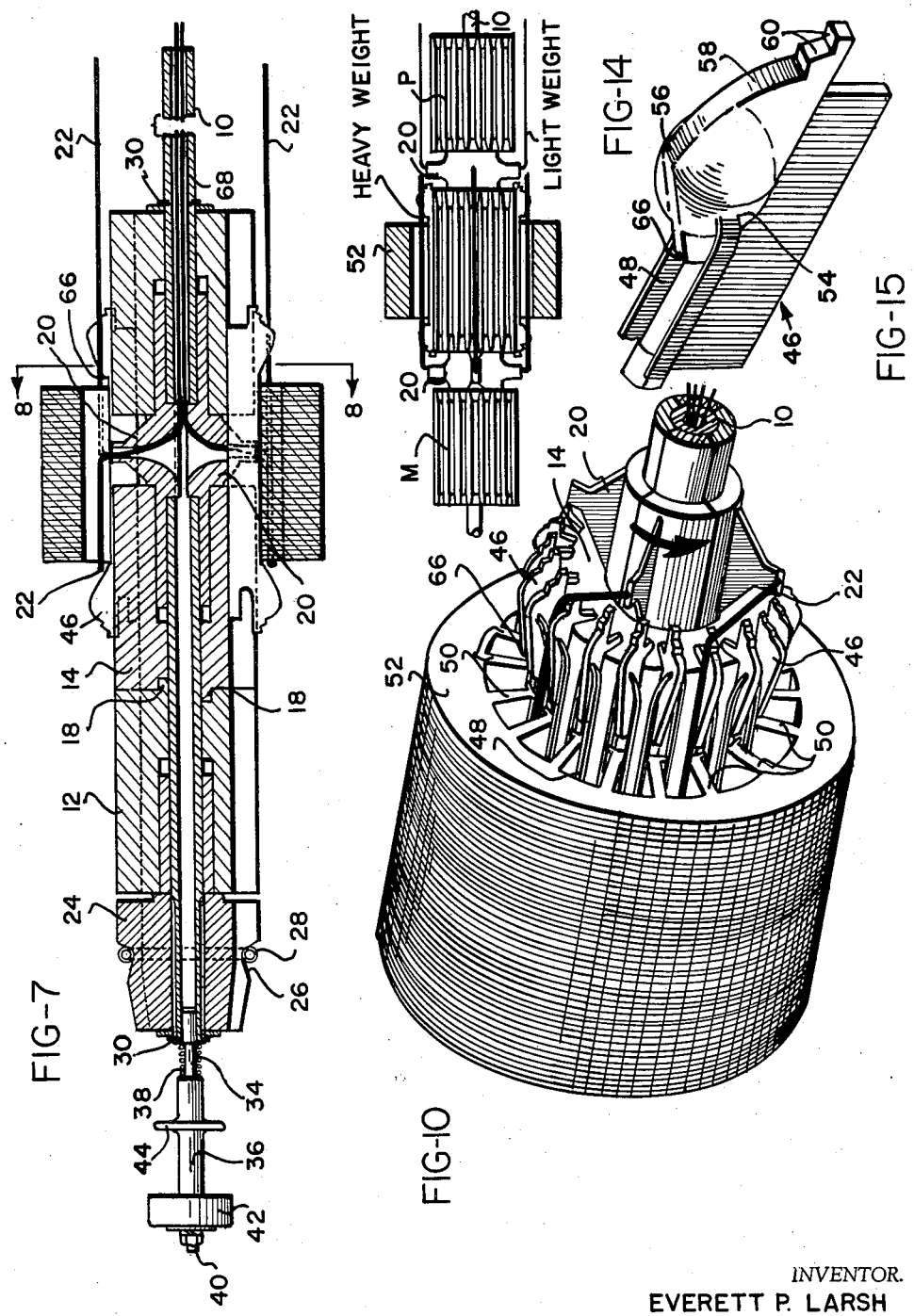

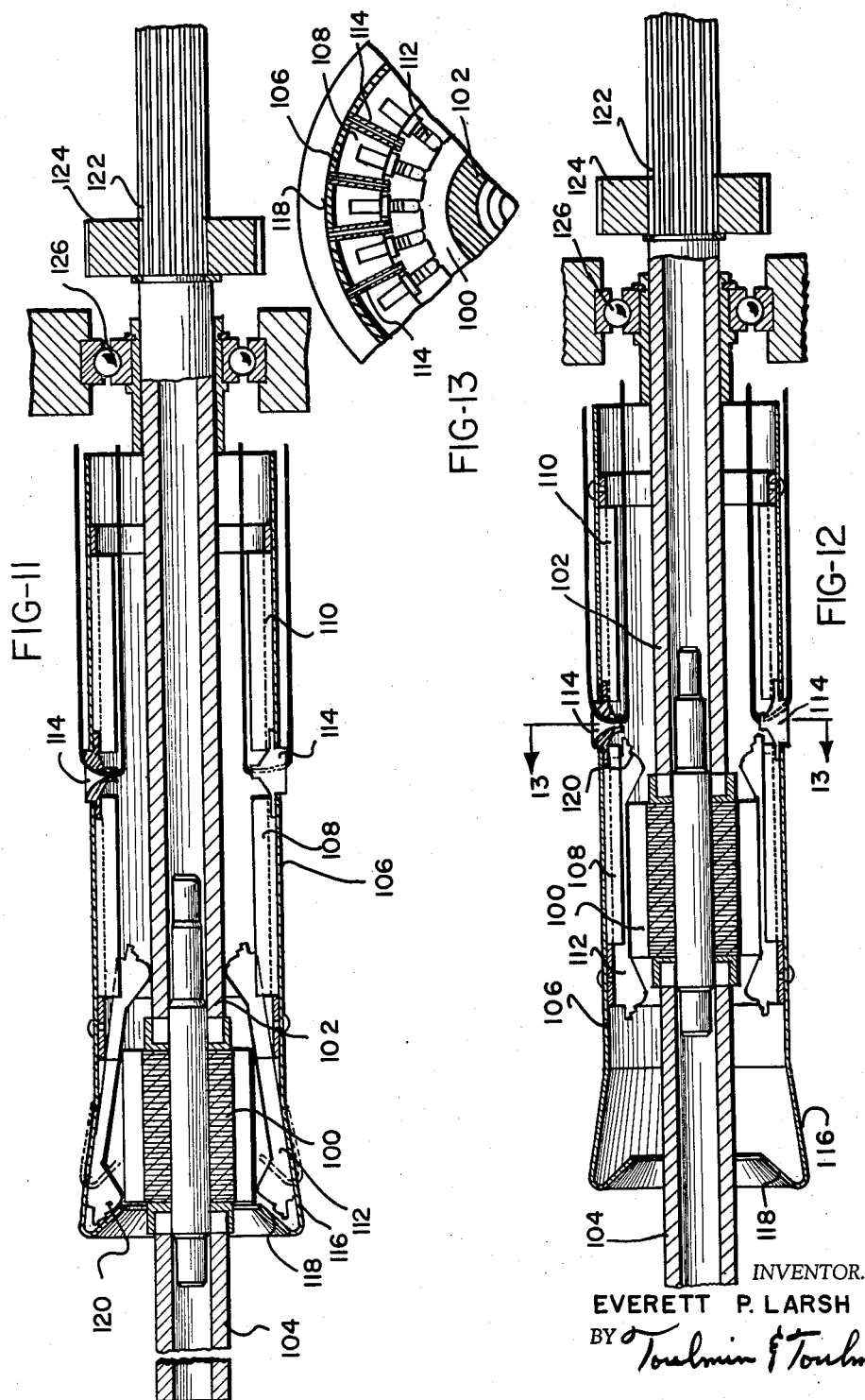

United States Patent Office 2,969,928
Patented Jan. 31, 1961

2,969,928

APPARATUS FOR WINDING COILS

Everett P. Larsh, 124 E. Monument, Dayton, Ohio

Filed Dec. 11, 1957, Ser. No. 702,108

8 Claims. (Cl. 242—1.1)

This invention relates to an improved apparatus for winding coils on electromagnetic members and is particularly concerned with such apparatus employed for winding electric motor stators and armatures.

Electric motors have either one or both of the rotor and stator thereof provided with windings which are applied to the iron portion of the member by being placed in slots therein. Usually, such windings are distributed, which is to say that the winding for one pole of a motor will be distributed over a plurality of slots thus providing for a proper form for the field established by the windings and providing for an efficient exchange of energy between the field windings and the armature windings when the rotor is a wound rotor.

Most electric motors have four or more poles, although some motors for high speed applications may only have two poles. The winding of the stators and armatures for motors of the type referred to is often carried out manually, but in recent years a number of automatic winding devices have been devised for accomplishing the automatic application of the coils to the motor elements.

The present invention is particularly concerned with an improved winding head for winding armatures and stators and is most particularly concerned with an improved winding head that facilitates the bringing together of the winding head and the element to be wound and which permits the winding on the element of as many coils at one time as the element has poles.

A particular object of this invention is the provision of a winding head adapted for use with a winding machine that has reciprocatory and oscillatory movement which will enable extremely rapid winding of a plurality of coils at one time and with the windings being applied to the element being wound in a particularly compact form.

Another object of this invention is the provision of a winding head that permits the application directly to armatures and stators of the coil windings without requiring any auxiliary elements for the guiding and locating of the wires.

A still further object of this invention is the provision of a winding head for winding stators and armatures which is relatively simple in construction and which embodies a minimum of wearing parts whereby the winding head can be maintained in efficient operating condition with a minimum of time and effort and expense.

Another object of this invention is the provision of a winding head structure for winding coils that is readily operable to both stators and armatures by a simple inversion of the winding head structure.

These and other objects and advantages will become more apparent upon reference to the accompanying drawings, in which:

Figure 1 is a longitudinal sectional view through a winding head constructed according to the present invention for winding stators, and with a stator being mounted on the head preparatory to a winding operation, Figure 2 is a transverse sectional view taken through the winding head in the plane of the wire feeding nozzles, drawn at enlarged scale and as indicated by line 2—2 on Figure 1, Figure 3 is a sectional view drawn at somewhat enlarged scale showing the manner in which the slidable wire guide elements forming a part of the winding head are engaged by the stator when the stator is mounted on the winding head and a winding operation is about to commence, Figure 4 is a sectional view indicated by line 4—4 on Figure 3 showing in cross section the stator and illustrating the manner in which the wire guide elements engage the tips of the teeth or bars that separate the stator slots, Figure 5 is a sectional view similar to Figure 1 but shows the stator after it has been mounted on the winding head and immediately prior to the initiation of a winding operation, Figure 6 is a sectional view like Figure 5 but shows the relative positions of the stator and the winding head after the wire feed nozzles have been moved through the stator from their Figure 5 position, Figure 7 is a sectional view like Figures 5 and 6 but shows the relative positions of the stator and winding head after the wire feed nozzles have been rotated from their Figure 6 position and have then commenced their return travel through the stator thereby to deposit a turn of wire in the stator slots, Figure 8 is a transverse sectional view indicated by line 8—8 on Figure 7 showing a partial turn of wire that has been placed in the stator slots, Figure 9 is a view similar to Figure 8 but shows the relative positions of the wire feed nozzles and the stator after the nozzles have completed their movement through the stator following the Figure 8 relative position and then have rotated relative to the stator clockwise to apply the end turn of the coil being wound, Figure 10 is a more or less diagrammatic perspective view showing the wire feed nozzles rotating relative to the stator in applying coils thereon, Figure 11 is a longitudinal sectional view taken through the winding head according to this invention, adapted for winding armatures and with an armature being inserted into the winding head, Figure 12 is a view like Figure 11 but shows the armature in position in the winding head preparatory to commencing a winding operation, Figure 13 is a transverse sectional view indicated by line 13—13 on Figure 12.

Figure 14 is a diagrammatic view illustrating a modified construction of the stator winding head wherein two separate winding operations can be carried out without removing the stator from the head, and Figure 15 is a perspective view showing more clearly the configuration of the wire guide members that engage the teeth of the electromagnetic member and remain fixed relative thereto during a winding operation so as to guide the end turns of the coils against the ends of the member.

Referring to the drawings more in detail and with particular reference to Figures 1 through 10, the winding head, according to the present invention, comprises a central tubular support shaft 10 that has mounted thereon the blocks 12, 14 and 16, that have a plurality of radial slots therein, uniformly circumferentially spaced and all in alignment in the axial direction of the winding head.

Blocks 12 and 14 are maintained in accurate alignment by the interengaging notch and tooth means 18. Blocks 14 and 16 are spaced apart on the tubular support shaft 10 and have located therebetween the nozzle elements 20.

Nozzle elements 20 are individually formed and fit together as indicated in Figure 2 so that they can be individually replaced when worn. These nozzles are preferably of metal and may, for example, be aluminum with hard eyes at their outer ends so that the wires 22 can be drawn therethrough without causing undue wear and without abrading the wires.

At the end of shaft 10 opposite block 16 there is a slotted nose piece 24 particularly characterized in that there is an annular recess 26 about the nose piece in which garter spring 28 is disposed. Snap rings 30 on opposite ends of the shaft 10 hold the blocks and nose piece and nozzles in central relation on shaft 10.

It will be noted that blocks 12, 14 and 16 are free to rotate on tubular support shaft 10, whereas the wire feed nozzles are keyed to the shaft by portions 32 of the nozzles that extend through apertures provided therefor in shaft 10. By reason of this arrangement the nozzles can be rotated relative to the slotted blocks 12, 14 and 16.

Fitted into the left end of support shaft 10, as is viewed in Figure 1, and which is the end bearing the nose piece 24, there is a rod 34 on which is slidably mounted a sleeve member 36 that is pressed outwardly on rod 34 by spring 38 and into abutment with a stop screw 40. The outer end of sleeve 36 has a cylindrical member 42 thereon and somewhat rightwardly of the center of the sleeve there is a radial flange 44.

Located within each slot about the winding head is a slidable wire guide element 46 which has a back part fitting into the slots and freely slidable therein while the outer part of each of the wire guide elements is in the form of a relatively shallow channel, best seen at 48 in Figure 4, that fits over the ends on tips of the teeth or bars 50 of stator 52.

The channels 48 are preferably provided by wear resistant stainless steel inserts in the wire guides that may have their end portions extending as at 54 into thickened end parts 56 of the wire guide members. The ends of the wire guide members, as mentioned before, are somewhat thickened and have an arcuate configuration 58 terminating in one or more steps 60 toward the outer ends of the wire guide members.

As will be seen hereinafter, the thickened arcuate portions of the wire guide members serve to guide the wires being wound into the stator slots toward the bottoms of the slots and to cause the end turns of each coil to lie against the ends of the stator in an arcuate path, thus preserving the clearance through the stator bore.

The slidable wire guide members 46, according to this invention, have slots 62 in their one ends adapted for engaging the garter spring 8 in groove 26 in nose piece 24. The wire guide members also have notches 64 therein spaced part way therealong in the back portions. This arrangement is such that when the wire guide members are moved leftwardly along the slotted blocks the garter spring 28 will be picked up in the notches 62 and this will pull the left ends of the wire guide members inwardly until they stop against the cup shaped member 42 and at which time the radial flange 44 also engages the notches 64.

The movement of the wire guide members to and from their various positions on the winding head is brought about by engagement of the stator with the wire guide members at the shoulders 66 located at opposite ends of the channel portions 48 of the wire guide members and which are engaged by the tips of the stator teeth or bars.

The described arrangement for tilting the wire guide members inwardly to their Figure 1 position permits the stators to be mounted on the winding head merely by aligning the teeth on the stator with the slidable wire guide elements and then moving the stator rightwardly on the winding head. The stator teeth will pick up the slidable wire guide members and move them rightwardly until the garter spring 28 again snaps into groove 26, at which time the wire guide members will be in the straight portions of their respective grooves and will be held in position by being engaged by the teeth of the stator.

Similarly, when a wound stator is removed from the winding head, it is merely moved leftwardly whereupon the wire guide members pick up the garter spring and move to their Figure 1 position and permit the stator to be taken from the winding head.

In carrying out a winding operation, a plurality of wires 68 are carried through hollow shaft 10 and are then led outwardly through the several nozzle elements 20. The wires 68 are carried from the nozzle elements rightwardly to points of attachment and cutoff which are generally indicated by the dot-dash boxes 70 in Figure 1. This mechanism forms no part of the present invention and is thus not disclosed in detail except that the function of the mechanisms is important since they hold the free ends of the wires when the winding operation is initiated and then can be utilized for cutting off the wires at the end of a winding operation to permit the wound stator to be removed. This operation can be carried out either manually or automatically.

An important feature of the present invention is in the cooperation that is had between the wire feeding nozzle elements 20 and the wire guide elements 46. This cooperation comes about when the outer tips of the nozzle elements are disposed outwardly a sufficient distance that wires leading therefrom will be deposited on the ends of the wire guide elements above the notches 60 thereof, so that when the wire is placed under tension, as would come about by rotation of the nozzle elements at either end of the stator, the wire will ride up the arcuate portions 58 of the wire guide elements and snap thereover into position against the end of the stator. The coils that are wound in this manner are thus compact and the wires at the same time are held outwardly from the bore through the stator so that no interference results with the rotor or armature that is subsequently placed in the stator when the final product is assembled in a motor.

The action of the several nozzles in depositing a wire on the ends of the wire guide members is somewhat diagrammatically illustrated in Figure 10 where it will be seen that the arcuate movement of the nozzle members will place the wire on the guide members in the manner described above.

Operation

The carrying out of a winding operation will be understood on reference to Figures 1 and 5 through 9.

As described before in Figure 1, the slotted stator is being placed on the winding head with the movement of the stator relative to the winding head toward the right, as indicated by the arrow. This picks up the wire guide members and they move rightwardly with the stator and are aligned therewith by engagement of the wire guide members with the teeth of the stator. Additionally, the winding head and stator could be mechanically oriented, if so desired, in order to insure proper engagement of the rotor teeth with the wire guide members. From its Figure 1 position the stators move to the Figure 5 position, at which time a winding operation may be commenced.

The winding operation is accomplished by reciprocating the stator and rotor relatively to carry the nozzle elements back and forth through the stator, and with there being relative oscillation between the stator and nozzle elements at each end position occupied by the nozzle elements so that coils are wound in the stator slots.

For example, from the Figure 5 position the stator and winding head are moved relatively to the Figure 6 position, and it will be apparent that the wires leading from the nozzle elements are drawn through the stator slots with which the nozzle elements are aligned.

Thereafter, the nozzle elements are rotated relative to the stator and winding head, and this will carry the several wires around the left end of the stator. This movement is illustrated in Figure 8 wherein it will be seen that the nozzle elements are moved counter clockwise relative to the stator. With the nozzle elements now aligned with another set of slots, the stator and winding head are again reciprocated relatively but in the opposite direction and this causes rightward movement of the nozzle elements through the stator, as illustrated in Figure 7, drawing the wires through the new set of slots. At the same time, the wires are drawn snugly against the left end of the stator.

After the nozzle elements have passed completely through the stator back to their Figure 5 position, relative oscillation between the nozzle elements and the winding head and stator again takes place but in the opposite direction to the previous oscillation, and the end turn at the right end of the stator is applied thereto, as indicated in Figure 9.

The foregoing cycle is repeated until as many turns as is desired are wound in the particular slots being employed. Thereafter, as would be the case with a distributed winding, the angle of relative oscillation between the nozzle elements and the winding head and stator is changed so that the coils wound will occupy different slots, ordinarily symmetrically located about the same axis as the coil first applied.

As many coils as desired can be wound on the stator in the described manner and merely by changing the limits of oscillation between the nozzle elements and the winding head, the coils can be located in the desired slots in a complete set of distributed windings placed on a stator simultaneously. The windings would be characterized in being substantially identical thereby producing a substantially balanced field pattern within the stator. The coils are as short as possible and as compact as possible, thus representing an efficient use of the copper in the field structure.

It will be apparent that as many or as few poles as desired could be wound at one time. For example, by bringing in only two wires, a two pole motor could be wound, and by utilizing six nozzles instead of four, a stator having three pairs of poles could be wound. Substantially no limits as to size of stator that can be wound obtain because no modifications need be made in the mechanism except as to physical size in order to wind any type of slotted stator frame.

A modification of the described arrangement is illustrated diagrammatically in Figure 14 wherein the section of the winding head marked "M" is adapted for applying the main windings to the stator, and after these windings have been applied, the stator is shifted to that portion along the winding head marked "P" and the phase winding is then wound on the stator, all windings being accomplished in the manner described above.

By this procedure split phase motors can readily be wound having a main winding of wire one weight and with phase windings with wire of lesser diameter.

Furthermore, the main winding could consist of two pairs of poles and the phase winding of a single pair of poles, if so desired.

It will be evident that other types of stator frames could be wound, such as three phase stators having windings distributed continuously thereabout, and reversible motors having two sets of substantially identical windings spaced apart at a predetermined angle and with there being in addition to the two sets of main windings, a phase winding disposed midway therebetween.

Inasmuch as the wire guide members reciprocate from one of the grooved blocks past the nozzle elements to another, the ends of the grooves may be tapered, as indicated at 70, so that the guide members will readily enter the grooves even though there should be some slight angular misalignment between the blocks.

The modification of Figures 11, 12 and 13 is one which is adapted for winding armatures. In this modification the apparatus is generally inverted so that the wire guide members are disposed around the outside of the slotted magnetic member instead of on the inside, as in the case of the previously described modification, and the wires are introduced into the slots from the outside.

A limitation in connection with the stator winding structure that is not encountered with the modification of Figures 11 through 13 is the number of wires that can be wound at one time. In most cases, the stator winding device will have from two to six nozzles thereby providing for from one to three pairs of poles, whereas with the armature there are a great many more individual coils so that in order to do a complete winding job, more wire feed nozzles should be employed at one time. The external location of the nozzles permits this arrangement.

A practical example of a relatively small armature for a repulsion-induction A.C. motor, is one having 28 slots in which are wound 28 conductors. These conductors are all wound at the same time, and it will be evident that if there were required 72 conductors per slot, 36 turns or 36 cycles consisting of two reciprocations and two oscillations relatively of the armature and the winding head would provide for a complete winding of the armature.

Referring more particularly to Figures 11 through 13, the armature to be wound, as indicated at 100, comprises axial slots, according to conventional practice. The armature is adapted for having one end supportingly engaged by a sleeve 102 and its opposite end engaged by a sleeve 104, and which sleeves support and locate the armature and either drive it in reciprocation and oscillation or support it while the winding head reciprocates and oscillates.

The winding head in this modification has an outer sleeve part 106 and located therein are the blocks 108 and 110 which are in the form of annular elements with internal slots in which the wire guide members 112 are receivable. As in the case of the stator winding head, there are as many of the wire guide members 112 as there are teeth between the slots of the armature, and these wire guide elements are engaged by the ends of the teeth so that they will remain with the armature in axially and circumferentially oriented positions during the winding operation.

Located between blocks 108 and 110 are the wire feed nozzles 114 and, as mentioned previously, there may be as many of the nozzles as there are coils to be placed on the armature.

The manner in which the armature is received into and removed from the winding head is similar to the manner in which the stator is mounted on and removed from its winding head, except that in the armature winding head the wire guide members 112 move outwardly to release the armature rather than inwardly as in the case of the stator winding head. The movement outwardly of the wire feed members is brought about by an outwardly flared portion 116 at the end of sleeve 106, and an inturned flange 118 thereon, which flange is adapted for engaging the tapered ends 120 of the wire guide members so that they are moved outwardly to their Figure 11 position to release and receive the armature.

Suitable detent means could be provided for retaining the wire guide members in their Figure 11 position, but in most cases the armature with the head will operate on a vertical axis with the left end portion thereof, as seen in Figures 11 and 12, lowermost so that the wire guide members would be held outwardly at their lower ends by gravity while at their opposite ends they would be supported by the sleeve member 102.

Either the armature or the winding head or both could take the necessary reciprocation for carrying out the winding operations, and either one or both could take the oscillatory movement necessary for applying the end turns to the coils. As illustrated, sleeve member 102 has splined means 122 on which a gear 124 is supported so that the sleeve can reciprocate relative to the gear while being adapted for being rotated by the gear. A bearing 126 may support the sleeve for rotation.

In operation, the winding head of Figures 11 through 13 operates in a manner substantially identical to the stator winding head already described, inasmuch as the wires are fitted through the wire feed nozzles and then are gripped by a gripping and cutoff mechanism and thereafter the armature is merely introduced into the winding head and then reciprocated and oscillated relative thereto and the coils to be placed thereon are automatically introduced into the armature slots, and at the end of the winding operation the armature is withdrawn from the winding head and the wires are cut off and the armature is then ready to pass to the next operation which may consist of impregnating and baking the windings, or connecting the several coil ends to the bars of a commutator to be placed on the armature shaft.

In both of the modifications described above, the important feature is present that the member to be wound can be brought together with the winding head and a winding operation carried out thereon by relatively simple movements between the magnetic member and the winding head. This adapts the winding heads to automatic machines and eliminates the necessity of extremely close observation of the winding machines. Both of the modifications are characterized in the provision of the combination of the wire feed nozzles and the wire guide members which causes the turns of wire to be applied to the member being wound without the use of auxiliary elements other than what are carried directly by the winding head. This results in much more rapid and more certain operation and eliminates expensive and troublesome complexities that have characterized winding machines of the prior art.

It is to be noted that the present invention is usable in circumstances other than the winding of slotted core members of the nature disclosed, and that such magnetic frames as might have salient poles, as in the case of D.C. motors, could be wound equally well. In the case of the winding of direct current poles, the wire guide members would be larger in that they would have end portions substantially wide as the pole piece being wound, but in essence the same procedure would be carried out in that the magnetic frame or core being wound could be assembled simply with the winding head and thereafter the winding accomplished by a simple relative reciprocation and oscillation between the winding head and the magnetic frame or core. It is thus to be understood that the present invention contemplates that a winding of devices of this nature, as well as the winding of the more common magnetic cores having multiple slots such as the type illustrated in the drawings.

It is also to be understood that while there is shown only a single wire feeding through each of the active nozzles in the winding head, there could be multiple wires fed therethrough, if so desired. This might be done where special windings were to be applied to a magnetic core or where a wire of the necessary circle mil area happened to be somewhat stiffer than desirable for the automatic winding operation. In such case two or more smaller wires totaling the same circle mil area could be employed and such wires fed simultaneously through the nozzles and wound simultaneously on the magnetic core thereby imparting the same electrical characteristics to the windings while avoiding the difficulty that would arise from the use of a stiffer wire.

It will be understood that this invention is susceptible to modification in order to adapt it to different usages and conditions; and, accordingly, it is desired to comprehend such modifications within this invention as may fall within the scope of the appended claims.

I claim:

1. In an apparatus for winding slotted electromagnetic members such as electric motor stators and armatures; a support, slotted blocks carried by said support in coaxial relation adapted for being telescoped with the electromagnetic member to be wound with the slots opening toward the slots in the electromagnetic member, guide elements in the slots in the blocks engageable with the tips of the teeth of the electromagnetic member and reciprocable therewith relative to the blocks while remaining in engagement with the tips of the teeth, wire feed nozzles carried by the support between the blocks and rotatable relative to the blocks and guide elements when disposed beyond the ends of said guide elements; said nozzle being reciprocable with said blocks along the slots of the electromagnetic member between said guide elements to lead wires through said slots, and said guide elements having each of their opposite ends formed so as to be convergent toward the electromagnetic member so that wires deposited on the ends of the said members by rotation of the nozzles when the nozzles are disposed beyond the ends of said guide elements will snap over the said ends of the members and lie against the ends of the electromagnetic member, each wire guide element engaging a single tooth of the electromagnetic member and leaving the slot on each side of the tooth unobstructed for receiving turns of wire.

2. In a winding head for winding electromagnetic members such as slotted electric motor armatures and stators; a support, coaxial blocks carried by the support in fixed spaced relation adapted for being brought into telescoping relation with the electromagnetic member, said blocks having axially extending slots, a wire guide member in each said slot, each wire guide member having a recessed portion extending along the middle part thereof adapted for engagement with the teeth of the electromagnetic member and with the end parts of the wire guide members extending over the ends of the said teeth and being convergent toward the electromagnetic member, a plurality of wire feed nozzles carried by the support between the blocks and extending radially into overlapping relation with the convergent ends of the wire guide members, said wire feed nozzles being rotatable relative to the blocks, and means for feeding wires through said nozzles whereby coils can be deposited on the electromagnetic member by reciprocation and oscillation thereof relative to the nozzles, said wire guide members being operable to guide the end turns of the coils against the ends of the teeth of the electromagnetic member, there being a tapered section carried by the support on the opposite side of one of said blocks from the wire feed nozzles, said tapered portion being adapted for permitting the wire guide members to move away from the electromagnetic member when the electromagnetic member is moved together with the wire guide members to the region of the said tapered portion thereby to release the electromagnetic member from the wire guide members, and means operable to move the wire guide members toward the said tapered portion when the wire guide members are moved into the region of each tapered portion.

3. A winding head for winding slotted electric motor armatures and stators; a support, axially slotted blocks carried by the support in fixedly spaced relation and rotatable relative to the support, wire feed nozzle means carried by the support between the blocks and rotatable with the support relative to the blocks, a wire guide member in each of the slots in the blocks reciprocable in the slots from one side of the wire feed nozzles to the other, said wire guide members having arcuate end parts convergent toward the electromagnetic member, and also having rectangular recesses intermediate the ends for engagement with the teeth of the electromagnetic member so that the wire guide members will travel with the electromagnetic member as it reciprocates relative to the blocks and wire feed nozzles, and means for bringing the electromagnetic member together with the wire guide members, and for releasing it therefrom comprising a tapered portion carried by the support for receiving the wire guide members in a position inclined away from the electromagnetic member when the electromagnetic member is moved into the region of said tapered portion, and said tapered portion comprising means for retaining the wire guide members releasably in their inclined positions after the electromagnetic member has been removed.

4. In a winding head for winding slotted electric motor stators, a hollow support shaft, a plurality of wire feed nozzles carried by the shaft and extending radially outwardly therefrom, an axially slotted block on the support shaft on each side of the nozzles, a wire guide member in each slot slidable in the blocks from one side of the nozzles to the other, said blocks being rotatable on the support shaft, an inwardly tapered nose piece on the support shaft on the opposite side of one of the blocks from the nozzles, resilient means carried by the nose piece adapted for engagement with the ends of the wire guide members operable to pull the ends of the wire guide members inwardly when they are moved over the nose piece, and each said wire guide member having a rectilinear recess in the center portion thereof adapted for engagement by the teeth of the stator and with end parts that extend out over the ends of the stator teeth and which are convergent toward the stator, the said end portions of the wire guide members at their tilted in ends being receivable within the bore of the stator whereby stators can be mounted on and removed from the winding head when the wire guide members are positioned on the nose piece.

5. In a winding head for a slotted electric motor stator; a hollow support shaft, wire feed nozzles mounted on the shaft for rotation and reciprocation therewith and being adapted for having wires fed thereto through the shaft, said nozzles having radial passages therein through which the wires extend, a slotted block on the support shaft on each side of the nozzles rotatable on the shaft, a wire guide member in each slot of one of the blocks reciprocable therein for movement into the slots of the other block, each wire guide member having a straight center portion adapted for receiving the teeth of a stator to be wound and having outwardly protuberant end parts for extending outwardly over the ends of the teeth of the stator, a slotted tapered nose piece on the support shaft on the opposite side of one of the blocks from the nozzles, the ends of the wire guide members toward the nose piece being slotted, a garter spring carried by the nose piece positioned to engage said notches so that movement of the wire guide members over the nose piece will cause tilting in of the ends thereof, and stop means to engage and stop the wire guide members in a tilted in position such that the stator will slide over the tilted in end parts of the wire guide members.

6. An apparatus for winding slotted electromagnetic members according to claim 1 in which the said slotted blocks are annular members having the slots extending along the inner periphery thereof whereby the blocks are adapted for receiving an armature therein, and said wire feed nozzles extending radially inwardly so as to supply the wires fed therethrough into the slots of an armature.

7. An apparatus for winding slotted electromagnetic members according to claim 1 in which the said slotted blocks are cylindrical members with the slots extending along the outer peripheries thereof whereby the blocks are adapted for being received in the bore of a stator, and said wire feed nozzles extending radially outwardly so as to deposit the wires fed thereby into the slots of a stator.

8. An apparatus for winding slotted electromagnetic members according to claim 1 in which there are three slotted blocks carried in axially spaced relation by the said support, and wherein there are sets of wire feed nozzles carried by the support between each of the end ones of the blocks and the center one of the blocks whereby by providing independent wire supply to the two sets of wire feed nozzles two independent sets of windings can be placed on an electro-magnetic member by availing of the two sets of wire feed nozzles.

References Cited in the file of this patent

UNITED STATES PATENTS

| 2,445,937 | Carpenter | July 27, 1948 |
| 2,723,804 | Martin | Nov. 15, 1955 |

FOREIGN PATENTS

| 725,231 | Great Britain | Mar. 2, 1955 |